(12) United States Patent
Dudar

(10) Patent No.: US 10,998,766 B2
(45) Date of Patent: May 4, 2021

(54) WIRELESS CHARGER ACTIVATION

(71) Applicant: Ford Global Technologies, LLC, Dearborn, MI (US)

(72) Inventor: Aed M. Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/634,601

(22) PCT Filed: Aug. 1, 2017

(86) PCT No.: PCT/US2017/044808
§ 371 (c)(1),
(2) Date: Jan. 28, 2020

(87) PCT Pub. No.: WO2019/027441
PCT Pub. Date: Feb. 7, 2019

(65) Prior Publication Data
US 2020/0161897 A1 May 21, 2020

(51) Int. Cl.
| | | |
|---|---|---|
| *H02J 50/10* | (2016.01) | |
| *H02J 7/00* | (2006.01) | |
| *H04B 5/00* | (2006.01) | |
| *H02J 50/60* | (2016.01) | |
| *B60L 53/124* | (2019.01) | |
| *B60L 53/12* | (2019.01) | |

(52) U.S. Cl.
CPC .............. *H02J 50/10* (2016.02); *B60L 53/12* (2019.02); *B60L 53/124* (2019.02); *H02J 7/0044* (2013.01); *H02J 7/0047* (2013.01); *H02J 50/60* (2016.02); *H04B 5/0037* (2013.01)

(58) Field of Classification Search
CPC .......... H02J 50/10; H02J 7/0044; H02J 50/90; H02J 7/0047; H02J 50/60; H04B 5/0037; B60L 53/124; B60L 2240/36; B60L 53/12
See application file for complete search history.

(56) References Cited

U.S. PATENT DOCUMENTS

| | | | |
|---|---|---|---|
| 8,936,691 B2 | 1/2015 | Leggett | |
| 9,065,157 B2 | 6/2015 | Van Wiemeersch et al. | |
| 2009/0278523 A1* | 11/2009 | Yoda ....................... | H02J 50/12 323/318 |
| 2012/0038317 A1 | 2/2012 | Miyamoto et al. | |
| 2014/0125277 A1 | 5/2014 | Van Wiemeersch et al. | |

(Continued)

FOREIGN PATENT DOCUMENTS

| | | |
|---|---|---|
| CN | 204131166 U | 1/2015 |
| CN | 103795109 B | 12/2015 |
| KR | 101458712 B1 | 7/2013 |

OTHER PUBLICATIONS

International Search Report of the International Searching Authority for PCT/US2017/044808 dated Oct. 12, 2017.

*Primary Examiner* — Ryan Johnson
(74) *Attorney, Agent, or Firm* — Brandon Hicks; Bejin Bieneman PLC

(57) ABSTRACT

A computer including a processor is programmed to determine that an object including ferrous material is in a charging field of an inductive charger, actuate the inductive charger, and determine a temperature of the object. The processor is further programmed to determine, based on the temperature, whether the inductive charger is operational.

20 Claims, 4 Drawing Sheets

(56) References Cited

U.S. PATENT DOCUMENTS

2014/0203770 A1    6/2014   Salter et al.
2016/0359339 A1   12/2016   Hwang et al.
2017/0117742 A1    4/2017   Nakhjiri et al.

* cited by examiner

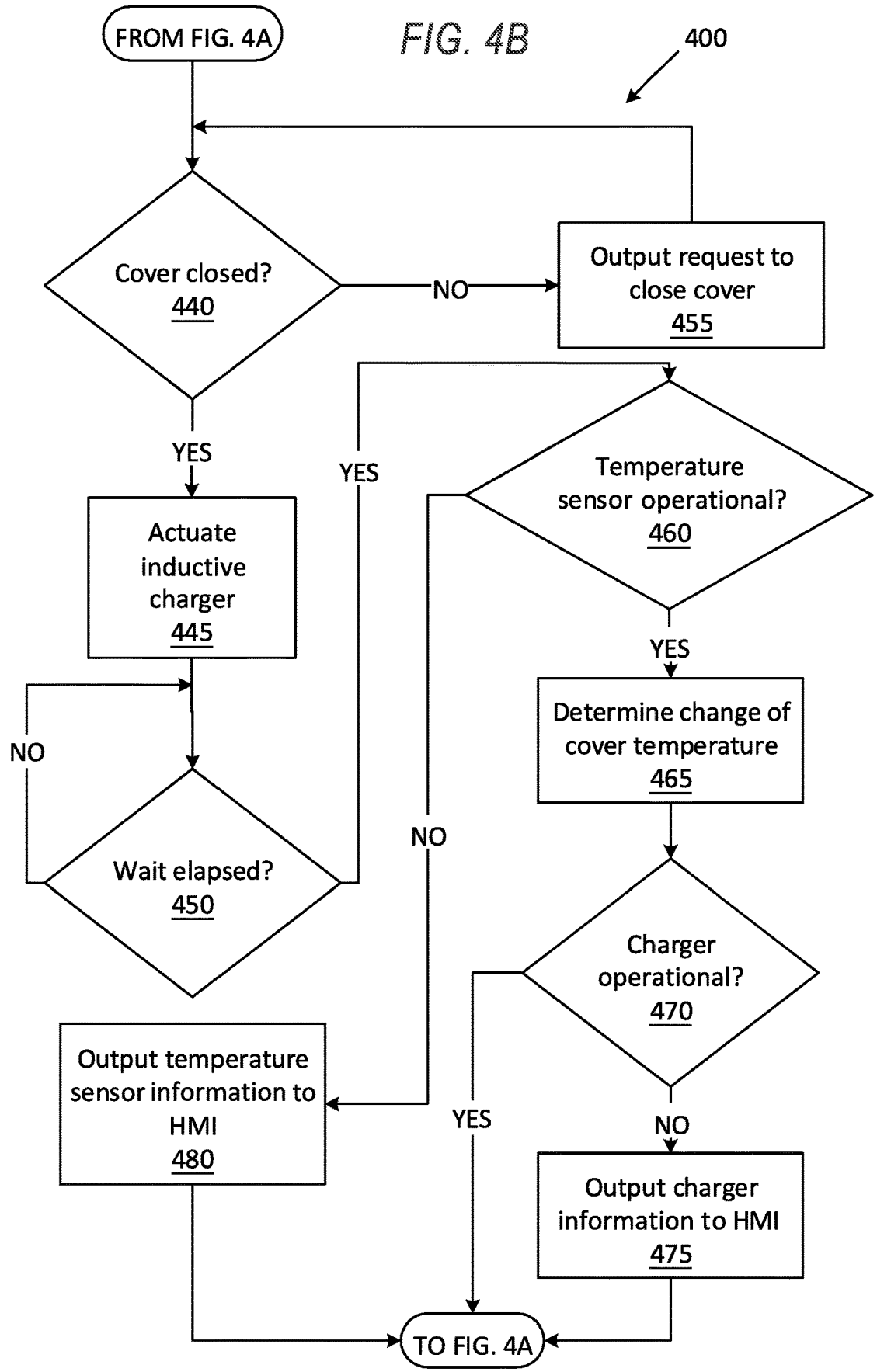

WIRELESS CHARGER ACTIVATION

BACKGROUND

A vehicle may include a wireless charger to charge various devices such as a smart phone, etc. Wireless chargers may be beneficial because of their convenience and ease of use resulting from the lack of an electrical wired connection to a device being charged. However, problems arise when a wireless charger in a vehicle fails to operate and/or do not operate properly.

BRIEF DESCRIPTION OF THE DRAWINGS

FIGS. 4A-4B are a flowchart of an exemplary process for operating the inductive charger.

DETAILED DESCRIPTION

Introduction

Figure 1:
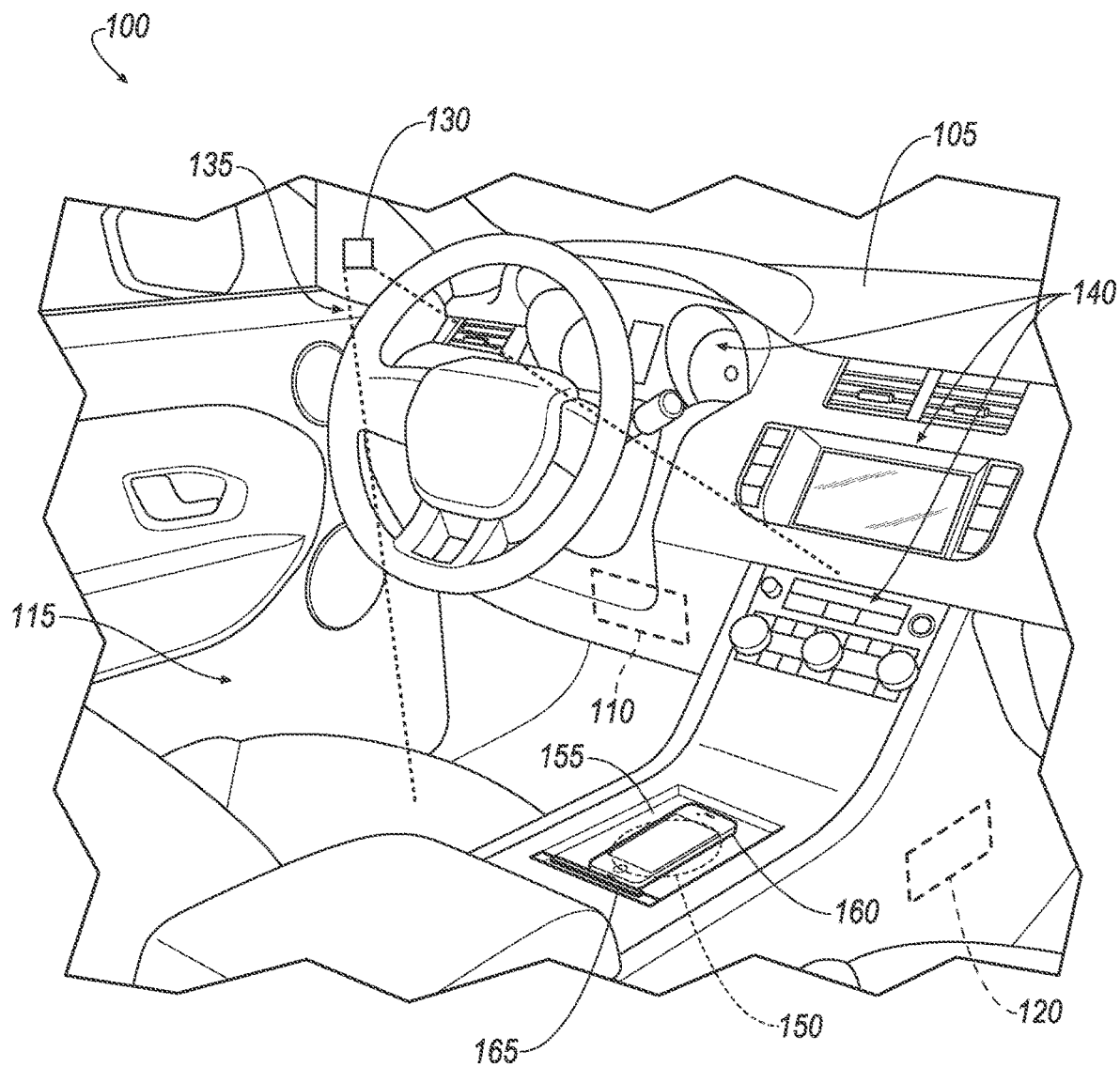
FIG. 1 is a perspective view of an example vehicle interior with an example inductive charger.

Disclosed herein is a computer including a processor that is programmed to determine that an object including ferrous material is in a charging field of an inductive charger and actuate the inductive charger. The processor is further programmed to determine a temperature of the object, and determine, based on the temperature, whether the inductive charger is operational.

The processor may be further programmed to determine whether the inductive charger is operational only after determining that no mobile device is present in the charging field.

The object may be a cover, and the processor may be further programmed to output, via a human machine interface, a request to remove a mobile device from the charging field and to close the cover.

The processor may be further programmed to determine the object is in the charging field based on data received from a position sensor.

The processor may be further programmed to determine the temperature of the object based on data received from a temperature sensor that is in the inductive charger.

The inductive charger may be disposed in a vehicle interior and the processor may be further programmed to determine whether the temperature sensor is operational based in part on an exterior temperature.

The processor may be further programmed to determine the temperature based on thermal image data received from a camera with a field of view including the object.

The object may touch an outer surface of the inductive charger when disposed in the charging field of the inductive charger.

The processor may be further programmed to determine a rate of temperature change and determine whether the inductive charger is operational based on the determined rate of temperature change and a predetermined rate of temperature change threshold.

The processor may be further programmed to charge a mobile device in the charging field by actuating the inductive charger.

The processor may be further programmed to deactivate the inductive charger while determining the temperature of the object.

The object may be a cover that has an open position and a closed position, wherein the cover in the closed position is in the charging field and the cover in the open position is outside the charging field.

The ferrous material may be in form of a layer, wherein at least one of the layer is disposed in the object and is attached to an outer surface of the object.

Further disclosed herein is a method that includes determining that an object including ferrous material is in a charging field of an inductive charger, actuating the inductive charger, determining a temperature of the object, and determining, based on the temperature, whether the inductive charger is operational. The object may be a cover.

The method may further include outputting, via a human machine interface, a request to remove a mobile device from the charging field and to close the cover.

Determining that the object is in the charging field may be based on data received from a position sensor.

Determining the temperature of the object may be based on data received from a temperature sensor that is in the inductive charger.

The method may further include determining a rate of temperature change and determining whether the inductive charger is operational based on the determined rate of temperature change and a predetermined rate of temperature change threshold.

The method may further include deactivating the inductive charger while determining the temperature of the object.

Further disclosed is a computing device programmed to execute the any of the above method steps.

Yet further disclosed is a computer program product, comprising a computer readable medium storing instructions executable by a computer processor, to execute any of the above method steps.

Exemplary System Elements

FIG. 1 is a block diagram of a vehicle 100. The vehicle 100 may be powered in variety of known ways, e.g., with an electric motor and/or internal combustion engine. The vehicle 100 may include an instrumentation panel (IP) 105, a computer 110, actuator(s) 120, sensor(s) 130, a human machine interface (HMI) 140, and a wireless inductive charger 150, each of which are discussed in more detail below.

The computer 110 includes a processor and a memory such as are known. The memory includes one or more forms of computer-readable media, and stores instructions executable by the computer 110 for performing various operations, including as disclosed herein.

The computer 110 may include programming to operate one or more of vehicle brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computer 110, as opposed to a human operator, is to control such operations.

The computer 110 is generally arranged for communications on a vehicle communication network, e.g., including a communication bus such as a controller area network (CAN) or the like. The computer 110 may include or be communicatively coupled to, e.g., via a vehicle communications bus as described further below, more than one processor, e.g., controllers or the like included in the vehicle for monitoring and/or controlling various subsystems such as a powertrain, brake, steering, etc.

Via the vehicle network, the computer 110 may transmit messages to various devices in the vehicle 100 and/or receive messages from the various devices, e.g., controllers, actuators, sensors, etc., including sensors 130. Alternatively or additionally, in cases where the computer 110 actually comprises multiple devices, the vehicle communication network may be used for communications between devices represented as the computer 110 in this disclosure. Further, as mentioned below, various controllers and/or sensors 130 may provide data to the computer 110 via the vehicle communication network.

In addition, the computer 110 may be configured for communicating through a wireless communication interface with a remote computer such as a mobile device 160. The wireless communication interface may communicate via a communication network. The communication network may be one or more of wireless communication mechanisms, including any desired combination of wireless (e.g., cellular, wireless, satellite, microwave and radio frequency) communication mechanisms and any desired network topology (or topologies when multiple communication mechanisms are utilized).

The wireless communication interface typically includes conventional electronic circuitry such as a wireless (or radio frequency) signal transmitter, a wireless (or radio frequency) signal receiver, and an amplifier circuit to boost an outgoing and incoming radio frequency signal. The vehicle 100 computer 110 may be programmed to receive a wireless signal, via the wireless signal receiver. The computer 110 may be programmed to identify an identifier of a device such as a mobile device 160 transmitting wireless signals based on the received wireless signal. The wireless signal receiver may be configured to receive wireless signals based on various wireless communication protocols, e.g., LTE, Bluetooth™, WAN, etc. For example, the computer 110 may be programmed to receive a request for charging a battery of the mobile device 160. The computer 110 may be programmed to determine whether the received request is from the mobile device 160 associated with the vehicle 100 (e.g., vehicle occupant mobile device) based on the received identifier of the mobile device 160.

Sensors 130 may include a variety of devices known to provide data via the vehicle communications bus. For example, the sensors 130 may include one or more cameras, radars, and/or Light Detection and Ranging (LIDAR) sensors disposed in the vehicle 100 providing data encompassing at least some of the vehicle interior and/or exterior. In one example shown in FIG. 1, the camera sensor 130 with a field of view 135 provides image data encompassing at least a part of vehicle 100 interior, e.g., the instrumentation panel 105.

The actuators 120 typically include circuits, chips, or other electronic components that can actuate various vehicle subsystems in accordance with appropriate control signals as is known. For instance, the actuators 120 may include one or more relays, servomotors, etc. The actuators 120, therefore, may be used to control braking, acceleration, and steering of the vehicle 100. The control signals used to control the actuators 120 may be generated by the computer 110, a control unit located in the vehicle 100, e.g., the brake controller, etc.

The HMI 140 may be configured to receive user input, e.g., during operation of the vehicle 100. As one example, an HMI 140 may include touchscreens, buttons, knobs, keypads, microphone, and so on for receiving information from a user. Moreover, an HMI 140 may include various interfaces such a Ford SYNC® computing interface, a smart phone, etc., for receiving information from a user and/or output information to the user.

Figure 2:
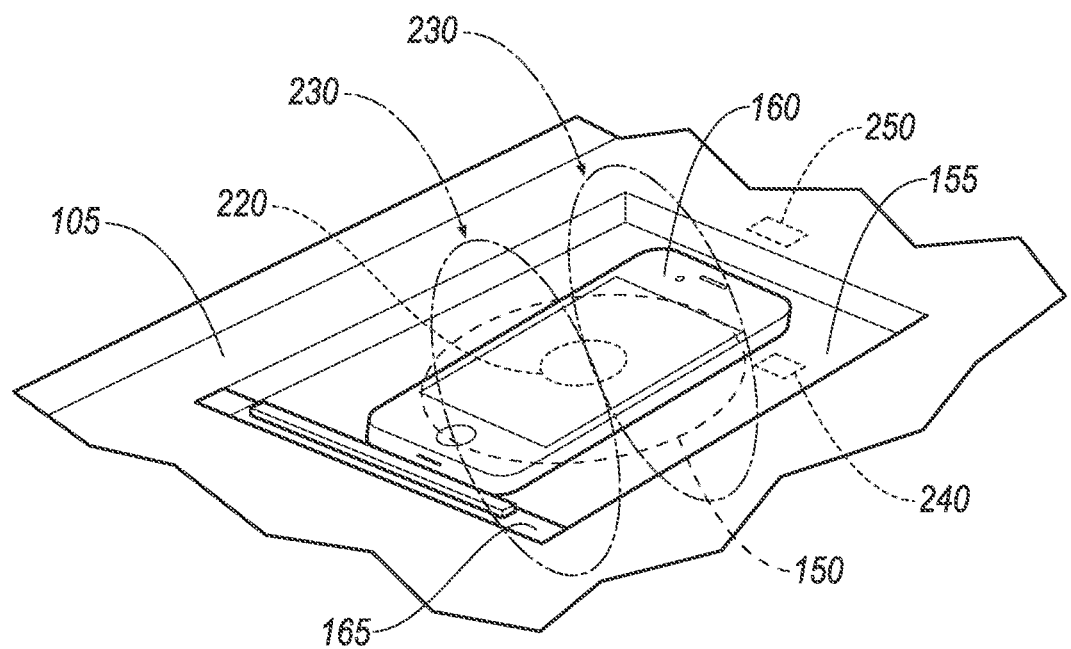
FIG. 2 is a perspective view of the inductive charger of FIG. 1, in an open position, charging a mobile device.
Figure 3:
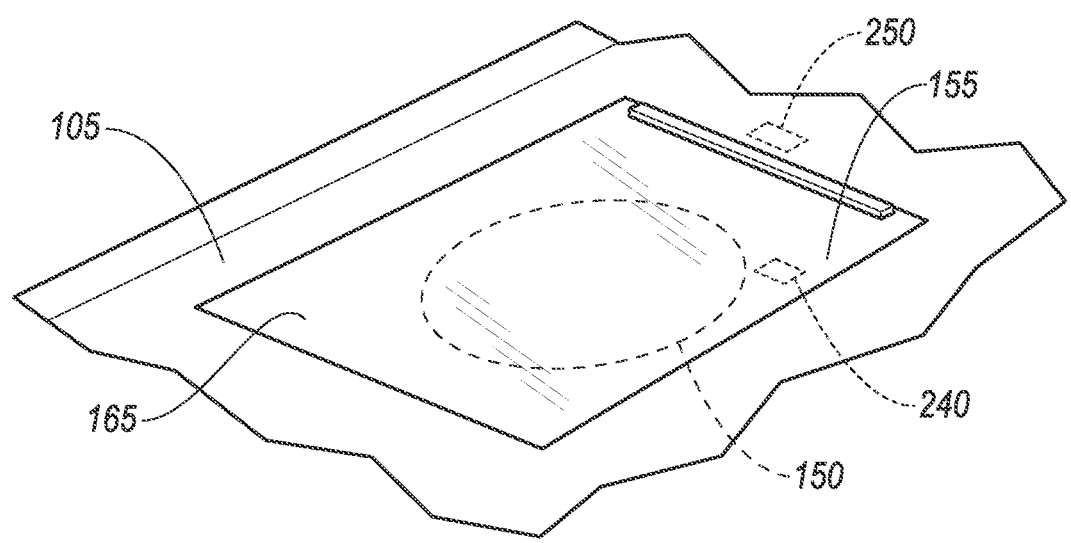
FIG. 3 is a perspective view of the inductive charger in a closed position.

With reference to FIGS. 1-3, the wireless inductive charger 150 may wirelessly charge a battery, e.g., a battery of the mobile device 160. The wireless inductive charger 150 may charge the battery using known magnetic induction techniques. The inductive charger 150 may be mounted to a vehicle 100 instrument panel 105. Thus, the inductive charger 150 may be disposed in an interior 115 of the vehicle 100. The inductive charger 150 may include a cover 165 with an open (see FIGS. 1-2) and a closed position (see FIG. 3). The wireless inductive charger 150 may include an outer surface 155 on which a device such as the mobile device 160 can be placed for charging while the cover 165 is in the open position (see FIGS. 1-2). The cover 165 may be slideably and/or pivotably moved from the open position to the closed position and vice versa. In one example, the cover 165 in the closed position completely covers the outer surface 155.

The computer 110 may be programmed to actuate the inductive charger 150 to generate a magnetic charging field 230. The charging field 230 may encompass at least a part of the outer surface 155 and an area above the surface 155. The inductive charger 150 may include a transmitter coil, electric and/or electronic components, etc. The transmitter coil may include conducting material such as copper wire, wrapped around a core of plastic, ferrous material, etc. For example, the charging field 230 may reach up to 5 cm (centimeters) above the outer surface 155.

The cover 165 may be formed of hard plastic, etc. The cover 165 may include ferrous material. The ferrous material may be a layer attached to an external surface of the cover 165 and/or between plastic layers of the cover 165. As discussed below, the cover 165 may be heated using inductive energy. The inductive charger 150 may cause electrical current in the ferrous material included in the cover 165. Additionally or alternatively, the vehicle 100 may include an object including ferrous material that can be placed on the outer surface 155. As discussed below, the computer 110 may be programmed to determine whether there is a deficiency in the inductive charger 150 based on generated heat in the object and/or cover 165.

The cover 165 in the closed position may touch the outer surface 155 of the inductive charger 150. Thus, the cover 165 may be at least in part within in the charging field 230 of the inductive charger 150. For example, the cover 165 may slideably move on the surface 155 while touching the surface 155. "Touching" in the present context means physically touching or having a gap less than or equal to 3 millimeters.

The mobile device 160 may include an inductive receiver 220 (e.g., an inductive coil) that receives electric energy via the charging field 230 upon placing the mobile device 160 on the surface 155 within the charging field 230, as shown in FIG. 2. A mobile device 160 processor may be programmed to actuate the inductive receiver 220 to receive electric energy from the charging field 230 and charge a rechargeable battery included in the mobile device 160.

The computer 110 may be programmed to actuate the inductive charger 150 to charge the device 160 battery upon, e.g., detecting the mobile device 160 on the outer surface 155 based on vehicle 100 sensor 130 data and/or receiving a request to charge the mobile device 160 battery. For example, the computer 110 may receive a request to charge the battery of the mobile device 160 via a vehicle 100 wireless communication interface. In the present context, this mode of operation of the charger 150 is referred to as "charging mode."

The wireless inductive charger 150 may fail to charge the mobile device 160, e.g., as a result of a deficiency in the inductive charger 150 and/or the mobile device 160. For example, the mobile device 160 processor may fail to actuate the inductive receiver 220 to receive electric energy from the charging field 230. Advantageously, the computer 110 can be programmed to determine whether the wireless inductive charger 150 is operational. Thus, the computer 110 is programmed to determine that an object, e.g., the cover 165, including ferrous material therein and/or thereon, is in the charging field 230 of the inductive charger 150, and can further be programmed to then actuate the inductive charger 150. The computer 110 is further programmed to determine a temperature of the object and determine, based on the temperature, whether the inductive charger 150 is operational (i.e., whether the inductive charger 150 can charge the device 160 if operated in the "charging mode"). In the present context, this mode of operation of the inductive charger 150 is referred to as "diagnostics mode." In the "diagnostics mode," the computer 110 determines whether the inductive charger 150 in the "charging mode" can wirelessly charge, e.g., the mobile device 160 battery.

The charging field 230 may induce inductive current in the ferrous material included in the object, e.g., the cover 165. The induced current generates a temperature increase in the ferrous material. Thus, the computer 110 may determine that the inductive charger 150 operates by determining a temperature increase in the object.

In one example, the computer 110 may be programmed to determine a rate of temperature change and to determine whether the inductive charger 150 is operational based on comparing the determined rate of temperature change to a predetermined threshold. The computer 110 may be programmed to determine that the inductive charger 150 is operational, i.e., can charge the device 160, upon determining that an increase of temperature exceeds a predetermined temperature rate of increase, e.g., 3 degrees Celsius per minute. The computer 110 may be programmed to determine a first temperature of the object at a time at which the inductive charger 150 is actuated, and a second temperature after a predetermined time, e.g., 1 minute, and to determine that the inductive charger 150 is operational based on the first and second temperatures.

The computer 110 may be further programmed to determine whether the inductive charger 150 is operational only after determining that no device such as the mobile device 160 is present in the charging field 230. As discussed above, the computer 110 may determine whether the inductive charger 150 is operational based on temperature changes of the object, e.g., the cover 165. In one example, the computer 110 may be programmed to output, via the HMI 140, a request to remove the mobile device 160 from the charging field 230 and to close the cover 165. The cover 165 may include ferrous material. Thus, in the closed position, the ferrous material included in the cover 165 may be within the charging field 230 of the inductive charger 150, whereas in the open position, the cover 165 and therefore the ferrous material may be outside the charging field 230.

The computer 110 may be programmed to determine that the object (e.g., the cover 165) is in the charging field 230 based on data received from a position sensor 250. In one example, the position sensor 250 may include a proximity switch, mechanical switch, etc. The computer 110 may be programmed to receive data from the position sensor 250 and determine whether the cover 165 is in the closed position based on the received data. The computer 110 may be programmed to determine that the cover 165 is closed only upon determining that the cover 165 completely covers the outer surface 155, e.g., based on data received from the position sensor 250. Additionally or alternatively, the computer 110 may be programmed to determine whether the cover 165 is in closed position and/or the object is placed on the outer surface 155 based on image data received from the camera sensor 130 with the field of view 135 including the outer surface 155. Thus, the computer 110 may be programmed to determine whether the cover 165 is closed using known image processing techniques.

The computer 110 may be programmed to determine the temperature of the object based on data received from a temperature sensor 240. The temperature sensor 240 may be mounted in the inductive charger 210, under the outer surface 155, etc. As discussed above, the cover 165 in the closed position may touch the outer surface 155. Thus, the temperature sensor 240 mounted, e.g., underneath the outer surface 155, may determine a temperature of the object, e.g., the cover, on the outer surface 155. Additionally or alternatively, the computer 110 may be programmed to determine the temperature of the over 165 based on thermal image data received from the camera sensor 130 using known image processing techniques.

As shown in FIGS. 2-3, the temperature sensor 240 may be in the charging field 230 which may cause deficiencies, e.g., electrical noise, in determining the temperature. In one example, the computer 110 may be programmed to deactivate the inductive charger 210 while determining the temperature of the object, the cover 165, etc.

The temperature sensor 240 may have deficiencies (i.e., faults or defects) which may result in an inaccurate temperature determination. In one example, the computer 110 may be programmed to determine whether the temperature sensor 240 is operational (i.e., is providing data within expected parameters, is not reporting a fault conditions, etc.) based in part on an exterior temperature of the vehicle 100. The vehicle 100 may include an ambient temperature sensor 130, e.g., mounted in the interior 115 of the vehicle 100. For example, the computer 110 may be programmed to determine whether the temperature sensor 240 is operational based on data received from the temperature sensor 240 and the ambient temperature sensor 130.

The computer 110 may determine a first temperature of the outer surface 155 and a first ambient temperature at a time of turning off the computer 110. The computer 110 may be further programmed to determine a second temperature of the outer surface 155 and a second ambient temperature upon turning on the vehicle 100. The computer 110 may be programmed to determine whether the temperature sensor 240 is operational based on a change of ambient temperature and a change of outer surface 155 temperature. The charger 150 including the temperature sensor 240 may be mounted to the IP 105. That is, temperature changes measured by the temperature sensor 240 may follow temperature changes of the vehicle 100 interior 115, although with a time delay. In one example, the computer 110 may be programmed to determine that the temperature sensor 240 has a deficiency upon determining that the received temperature data from the temperature sensor 240 is changed over a predetermined time, e.g., 30 minutes, within a range threshold, e.g., 2 degrees Celsius, whereas the ambient temperature changes over the predetermined time more than a second range threshold, e.g., 10 degrees. In other words, while the ambient sensor shows a change the temperature sensor 240 does not change accordingly.

Processing

Figure 4A:
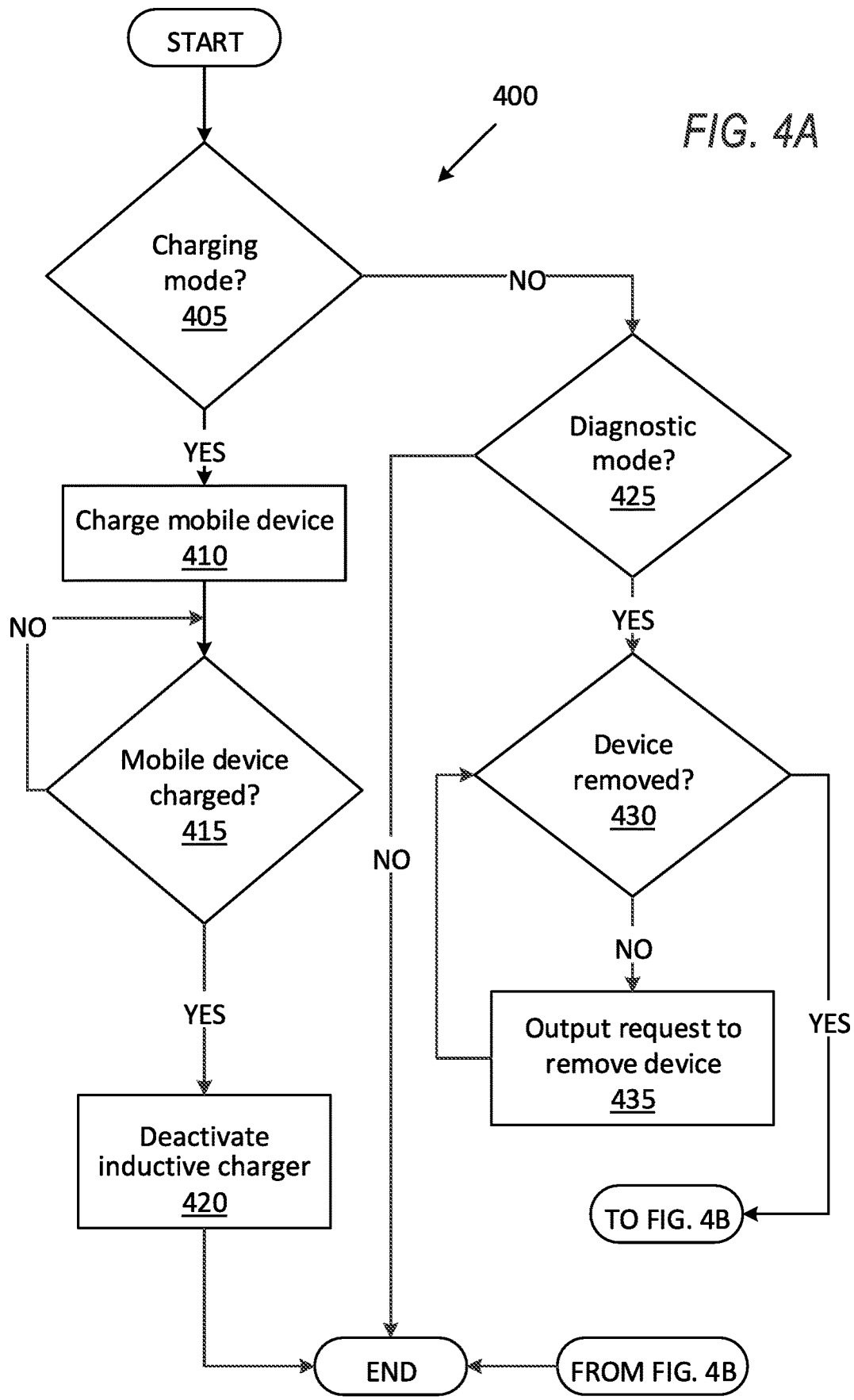

FIGS. 4A-4B are a flowchart of an exemplary process 400 for operating the inductive charger 150. In one example, the computer 110 may be programmed to execute blocks of the process 400.

The process 400 begins in a decision block 405 (see FIG. 4A), in which the computer 110 determines whether the charger 150 is in the charging mode. For example, the computer 110 may be programmed to determine that the charger 150 is in the "charging mode" upon receiving a request from the mobile device 160 to charge the device 160 battery. If the computer 110 determines that the inductive charger 150 is in the "charging mode" then the process 400 proceeds to a block 410; otherwise the process 400 proceeds to a decision block 425.

In the block 410, the computer 110 actuates the inductive charger 150 to charge the device 160 battery. For example, the computer 110 may be programmed to actuate the inductive charger 150 with a magnitude and/or frequency determined based on data received via the wireless communication interface from the mobile device 160. Additionally, the computer 110 may be programmed to actuate the charger 150 only upon determining that the device 160 is within the charging field 230. "Within the charging field 230" may be defined as (i) an area where magnitude of the magnetic field exceeds a threshold such as 10 µT (micro tesla), and/or (ii) an area within a distance threshold, e.g., 2 mm, from the outer surface 155. For example, the computer 110 may be programmed to determine that the device 160 is placed in the charging field 230 based on received feedback from the inductive charger 150, using conventional induction techniques. As another example, the computer 110 may be programmed to determine that the device 160 is within in the charging field 230 based on received image data from the camera sensor 130 with the field of view 135 that includes the outer surface 155.

Next, in a decision block 415, the computer 110 determines whether the mobile device 160 battery is charged. For example, the computer 110 may be programmed to receive a charging status from the mobile device 160 via the vehicle 100 wireless communication interface. The charging status in the present context may include a percentage of battery charge, i.e., from 0 to 100%. If the computer 110 determines that the battery is charged, then the process 400 proceeds to a block 420; otherwise the process 400 returns to the decision block 415.

In the block 420, the computer 110 deactivates the inductive charger 150. Following the block 420, the process 400 ends, or alternatively returns to the decision block 405, although not shown in FIG. 4A.

In the decision block 425, the computer 110 determines whether the charger 150 is in the diagnostics mode. For example, the computer 110 may determine that the charger 150 is in the "diagnostics mode" upon receiving a request from the HMI 140, e.g., based on user input, to test the charger 150. If the computer 110 determines that the inductive charger 150 is in the diagnostic mode, then the process 400 proceeds to a decision block 430; otherwise the process 400 ends, or alternatively returns to the decision block 405, although not shown in FIG. 4A.

In the decision block 430, the computer 110 determines whether the mobile device 160 is removed from the outer surface 155. For example, the computer 110 may be programmed to determine whether the device 160 is removed based on received image data from the camera sensor 130 with the field of view 135 including the outer surface and/or feedback electric signal received from the inductive charger 150. If the computer 110 determines that the device 160 is removed from the outer surface 155, then the process 400 proceeds to a decision block 440 (see FIG. 4B); otherwise the process 400 proceeds to a block 435.

In the block 435, the computer 110 outputs a request to, e.g., via HMI 140, to remove the device 160 from the outer surface 155. Following the block 435, the process 400 returns to the decision block 430.

Turning to FIG. 4B, in the decision block 440, the computer 110 determines whether the cover 165 is closed. The computer 110 may be programmed to determine that the cover 165 is closed based on data received from the position sensor 250 and/or image data received from the camera sensor 130. Additionally or alternatively, the computer 110 may be programmed to determine that an object including ferrous material is disposed in the charging field 230. If the computer 110 determines that the cover 165 is closed, then the process 400 proceeds to a block 445; otherwise the process 400 proceeds to a block 455.

In the block 455, the computer 110 outputs a request, e.g., via the HMI 140, to close the cover 165. Additionally or alternatively, the computer 110 may be programmed to actuate a vehicle 100 actuator 120 to close the cover 165. Following the block 455, the process 400 returns to the decision block 440.

In the block 445, the computer 110 actuates the inductive charger 150 to heat the object, e.g., the cover 165.

Next, in a decision block 450, the computer 110 determines whether a predetermined wait time, e.g., 1 minute, has elapsed. If the computer 110 determines that the predetermined wait time has elapsed, then the process 400 proceeds to a decision block 460; otherwise the process 400 returns to the decision block 450.

In the decision block 460, the computer 110 determines whether the temperature sensor 240 has a deficiency. For example, the computer 110 may be programmed to determine whether the temperature sensor 240 is faulty based on a determined change of ambient temperature and a change of outer surface 155 temperature. If the computer 110 determines that the temperature sensor 240 is operational (OK), then the process 400 proceeds to a block 465; otherwise the process 400 proceeds to a block 480.

In the block 465, the computer 110 determines a change of the temperature of the cover 165. For example, the computer 110 may be programmed to determine a change of the cover 165 temperature since start of heating the cover 165, e.g., based on data received from the temperature sensor 240, the image data received from the camera sensor 130, etc.

Next, in a decision block 470, the computer 110 determines whether the inductive charger 150 is operational. For example, the computer 110 may determine whether the charger 150 is operational based on the determined change of temperature of the cover 165 and a predetermined minimum expected rate of temperature change, e.g., 3 degrees Celsius per minute. If the computer 110 determines that the inductive charger 150 is operational, then the process 400 ends (see FIG. 4A), or alternatively, returns to the decision block 405, although not shown in FIGS. 4A-4B; otherwise the process 400 proceeds to a block 475.

In the block 475, the computer 110 outputs information to the HMI 140, e.g., including deficiency of the charger 150. Following the block 475, the process 400 ends (see FIG.

4A), or alternatively, returns to the decision block 405, although not shown in FIGS. 4A-4B.

In the block 480, computer 110 outputs temperature sensor 240 information to the HMI 140, e.g., including deficiency of the temperature sensor 240. Following the block 480, the process 400 ends (see FIG. 4A), or alternatively, returns to the decision block 405, although not shown in FIGS. 4A-4B.

The article "a" modifying a noun should be understood as meaning one or more unless stated otherwise, or context requires otherwise. The phrase "based on" encompasses being partly or entirely based on.

Computing devices as discussed herein generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH, an EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

What is claimed is:

1. A computer, comprising a processor programmed to:
   determine that an object including ferrous material is in a charging field of an inductive charger;
   actuate the inductive charger;
   determine a temperature of the object; and
   determine, based on the temperature, whether the inductive charger is operational.

2. The computer of claim 1, wherein the processor is further programmed to determine whether the inductive charger is operational only after determining that no mobile device is present in the charging field.

3. The computer of claim 2, wherein the object is a cover, and the processor is further programmed to output, via a human machine interface, a request to remove a mobile device from the charging field and to close the cover.

4. The computer of claim 1, wherein the processor is further programmed to determine the object is in the charging field based on data received from a position sensor.

5. The computer of claim 1, wherein the processor is further programmed to determine the temperature of the object based on data received from a temperature sensor that is in the inductive charger.

6. The computer of claim 5, wherein the inductive charger is disposed in a vehicle interior and the processor is further programmed to determine whether the temperature sensor is operational based in part on an exterior temperature.

7. The computer of claim 1, wherein the processor is further programmed to determine the temperature based on thermal image data received from a camera with a field of view including the object.

8. The computer of claim 1, wherein the object touches an outer surface of the inductive charger when disposed in the charging field of the inductive charger.

9. The computer of claim 1, wherein the processor is further programmed to determine a rate of temperature change and determine whether the inductive charger is operational based on the determined rate of temperature change and a predetermined rate of temperature change threshold.

10. The computer of claim 1, wherein the processor is further programmed to charge a mobile device in the charging field by actuating the inductive charger.

11. The computer of claim 1, wherein the processor is further programmed to deactivate the inductive charger while determining the temperature of the object.

12. The computer of claim 1, wherein the object is a cover that has an open position and a closed position, wherein the cover in the closed position is in the charging field and the cover in the open position is outside the charging field.

13. The computer of claim 1, wherein the ferrous material is in the form of a layer, wherein at least one of the layer is disposed in the object and is attached to an outer surface of the object.

14. A method, comprising:
    determining that an object including ferrous material is in a charging field of an inductive charger;
    actuating the inductive charger;

determining a temperature of the object; and determining, based on the temperature, whether the inductive charger is operational.

15. The method of claim 14, wherein the object is a cover.

16. The method of claim 15, further comprising outputting, via a human machine interface, a request to remove a mobile device from the charging field and to close the cover.

17. The method of claim 14, wherein determining that the object is in the charging field is based on data received from a position sensor.

18. The method of claim 14, wherein determining the temperature of the object is based on data received from a temperature sensor that is in the inductive charger.

19. The method of claim 14, further comprising determining a rate of temperature change and determining whether the inductive charger is operational based on the determined rate of temperature change and a predetermined rate of temperature change threshold.

20. The method of claim 14, further comprising deactivating the inductive charger while determining the temperature of the object.

* * * * *